US006973617B1

(12) United States Patent
Parasu

(10) Patent No.: US 6,973,617 B1
(45) Date of Patent: Dec. 6, 2005

(54) APPARATUS AND METHOD FOR CONTACTING A CUSTOMER SUPPORT LINE ON CUSTOMER'S BEHALF AND HAVING A CUSTOMER SUPPORT REPRESENTATIVE CONTACT THE CUSTOMER

(75) Inventor: Nagendran Parasu, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/577,320

(22) Filed: May 24, 2000

(51) Int. Cl.[7] .......................... G06F 17/24; H04M 1/00
(52) U.S. Cl. .................. 715/513; 379/211.01; 379/900
(58) Field of Search ........................ 715/513; 704/270; 707/4; 709/227; 379/900; 370/352

(56) References Cited

U.S. PATENT DOCUMENTS

| | | | | |
|---|---|---|---|---|
| 5,533,109 | A | 7/1996 | Baker | |
| 5,943,399 | A * | 8/1999 | Bannister et al. | 379/88.17 |
| 5,991,394 | A | 11/1999 | Dezonno et al. | |
| 6,052,367 | A * | 4/2000 | Bowater et al. | 370/352 |
| 6,154,738 | A * | 11/2000 | Call | 707/4 |
| 6,269,336 | B1 * | 7/2001 | Ladd et al. | 704/270 |
| 6,314,402 | B1 * | 11/2001 | Monaco et al. | 704/275 |
| 6,350,066 | B1 * | 2/2002 | Bobo, II | 709/206 |
| 6,404,860 | B1 * | 6/2002 | Casellini | 379/88.17 |
| 6,473,423 | B1 * | 10/2002 | Tebeka et al. | 370/352 |
| 6,507,817 | B1 * | 1/2003 | Wolfe et al. | 704/260 |
| 6,529,501 | B1 * | 3/2003 | Zhao et al. | 379/88.17 |
| 6,578,000 | B1 * | 6/2003 | Dodrill et al. | 704/270 |
| 6,587,547 | B1 * | 7/2003 | Zirngibl et al. | 379/88.17 |
| 6,597,685 | B2 * | 7/2003 | Miloslavsky et al. | 379/900 |
| 6,879,586 | B2 * | 7/2003 | Miloslavsky et al. | 370/352 |
| 6,711,618 | B1 * | 3/2004 | Danner et al. | 709/228 |
| 6,731,625 | B1 * | 5/2004 | Eastep et al. | 370/352 |
| 6,738,803 | B1 * | 5/2004 | Dodrill et al. | 715/513 |
| 2002/0004796 | A1 * | 1/2002 | Vange et al. | 707/10 |
| 2003/0061354 | A1 * | 3/2003 | Burg et al. | 709/227 |
| 2003/0123622 | A1 * | 7/2003 | Gifford et al. | 379/88.13 |

* cited by examiner

*Primary Examiner*—Doug Hutton
(74) *Attorney, Agent, or Firm*—Leon R. Turkevich; Edward J. Stemberger

(57) ABSTRACT

A method is provided in an application server configured for responding to hypertext transport protocol (HTTP) requests. The method includes storing, in response to a first HTTP request, an XML document that specifies for a user, a call number of a second party. The stored XML document is retrieved based on a second HTTP request by the user. A first HTML document is generated based on the retrieved XML document. The first HTML document has instructions including the call number for accessing the second party. A second HTML document is generated based on a prescribed input received from the second party. The second HTML document has instructions for connecting the second party with the user. Hence, a user may speak with a called party without ever having to remain on hold.

6 Claims, 6 Drawing Sheets

```xml
<?xml version="1.0"?>
<!DOCTYPE DOCUMENT [
<!ELEMENT DOCUMENT (Menu Variables, Options)>
<!ELEMENT MenuVariables (#PCDATA)*>
<!ATTLIST MenuVariables name CDATA #REQUIRED
                        value CDATA #REQUIRED
<!ELEMENT Options       (#PCDATA)*>
<!ATTLIST Options name CDATA #REQUIRED
                  value CDATA #REQUIRED
                  text CDATA #IMPLIED>
]>
<DOCUMENT>
  <MenuVariables name="MenuName"      value="Main Menu"/>
  <MenuVariables name="DefaultPrompt" value="AUD_MAIN_MENU_PROMPT.wav"/>
  <MenuVariables name="Components"    value=""/>
  <MenuVariables name="Conditions"    value=""/>
  <MenuVariables name="Fallback"      value="LOGOUT_CLEANUP.xml"/>
  <MenuVariables name="Type"          value="MENU"/>
  <MenuVariables name="InputMask"     value=StandardMenu"/>
  <MenuVariables name="Images"        value=""/>
  <MenuVariables name="Text"          value="To get your messages, press1. To logout, press *9"/>
  <Options name="1" value="MENU:ACT_GET_VOICE_MESSAGES.xml"
           text="Access your messages."/>
  <Options name="2" value="SOUND:AUD_MAIN_MENU_HELP.wav"
           text="Access your messages."/>
  <Options name="*9" value="DECISION:LOGOUT_CLEANUP.xml"
           text="Send a message."/>
</DOCUMENT>
```

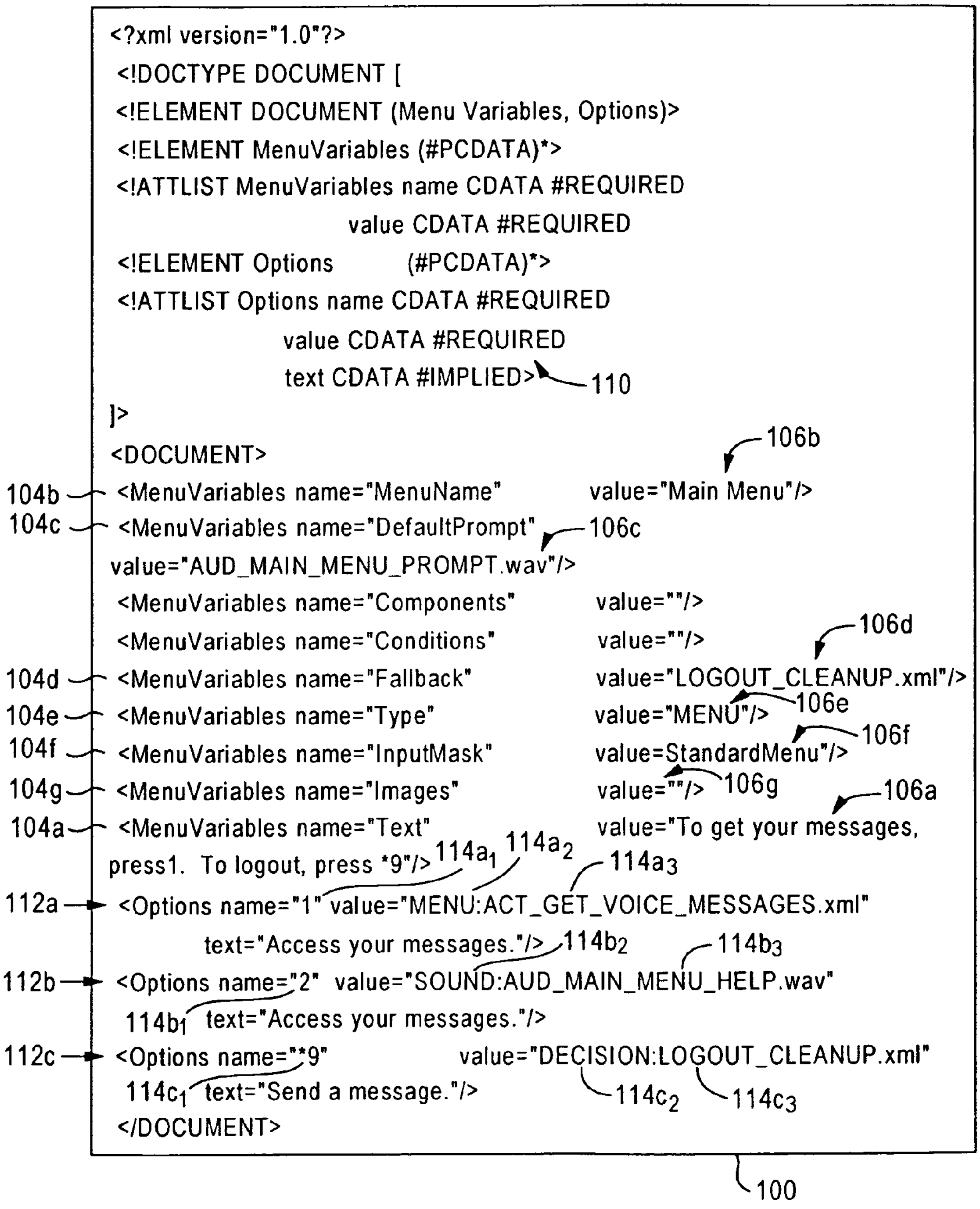

Figure 3

APPARATUS AND METHOD FOR CONTACTING A CUSTOMER SUPPORT LINE ON CUSTOMER'S BEHALF AND HAVING A CUSTOMER SUPPORT REPRESENTATIVE CONTACT THE CUSTOMER

BACKGROUND OF THE INVENTION

1. Field of the Invention

The present invention relates to generating and executing voice enabled web applications within a hypertext markup language (HTML) and hypertext transport protocol (HTTP) framework.

2. Description of Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An IP network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed.

When using a public switched telephone network to call a customer support line, typically the caller or customer is placed on hold and the call is placed in a queue. When the caller reaches the top of the queue, often after waiting 15–20 minutes, the call is answered by the customer service representative. Hence, the caller wastes time and network resources in trying to contact the support representative.

Conventional callback systems have been employed to call a caller back when the called party is available. However, such systems must be present at the called party's premises and require knowledge of the public switch telephone network to implement.

SUMMARY OF THE INVENTION

There is a need for an arrangement that enables voice applications to be implemented on an IP packet switched network using the open standards-based flexibility of the IP network.

There is also a need for an arrangement that enables voice applications to be implemented using HTTP and HTML open standards, enabling development of voice applications by individuals that do not have expertise in the public switched telephone network. For example, there is a need for arrangement that enables voice applications to be designed by web programmers.

There is also a need for an arrangement that enables voice applications to be implemented using an IP network.

There is also a need for an arrangement that enables an application server to call a second party on behalf of a caller, to call back the caller when the second party is available, and to bridge the calls connecting the second party and the caller so that the caller need not wait on hold in order to speak with the second party.

These and other needs are attained by the present invention, where an application server is configured for executing an executable voice application. The application server includes an application runtime environment which generates a first hypertext markup language (HTML)= document based on an XML document. The first HTML document has instructions including the call number for accessing the second party. The application runtime environment generates a second HTML document based in a prescribed input received from the second party. The second HTML document has instructions for connecting the second party with the user. A storage medium is configured for storing the XML document.

According to one aspect of the present invention, a method is provided in an application server configured for responding to hypertext transport protocol (HTTP) requests. The method includes storing, in response to a first HTTP request, an XML document that specifies for a user, a call number of a second party. The stored XML document is retrieved based on a second HTTP request by the user. A first HTML document is generated based on the retrieved XML document. The first HTML document has instructions including the call number for accessing the second party. A second HTML document is generated based on a prescribed input received from the second party. The second HTML document has instructions for connecting the second party with the user. Hence, a user may speak with a called party without ever having to remain on hold.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 3 is a diagram illustrating an XML document configured for defining a voice application operation for the application server of FIGS. 1 and 2.

BEST MODE FOR CARRYING OUT THE INVENTION

The disclosed embodiment is directed to an arrangement for providing unified voice messaging services and data services via an IP network using a web browser having audio control for voice enabled web applications. The ability to provide unified voice messaging services via an IP network enables existing web servers on the World Wide Web or in corporate intranets to support telephone applications on a scalable and economic platform. Moreover, providing unified voice messaging services via an IP network enables use of open standards that permits web programmers to use existing web programming techniques to design and implement voice telephone applications.

Figure 1:
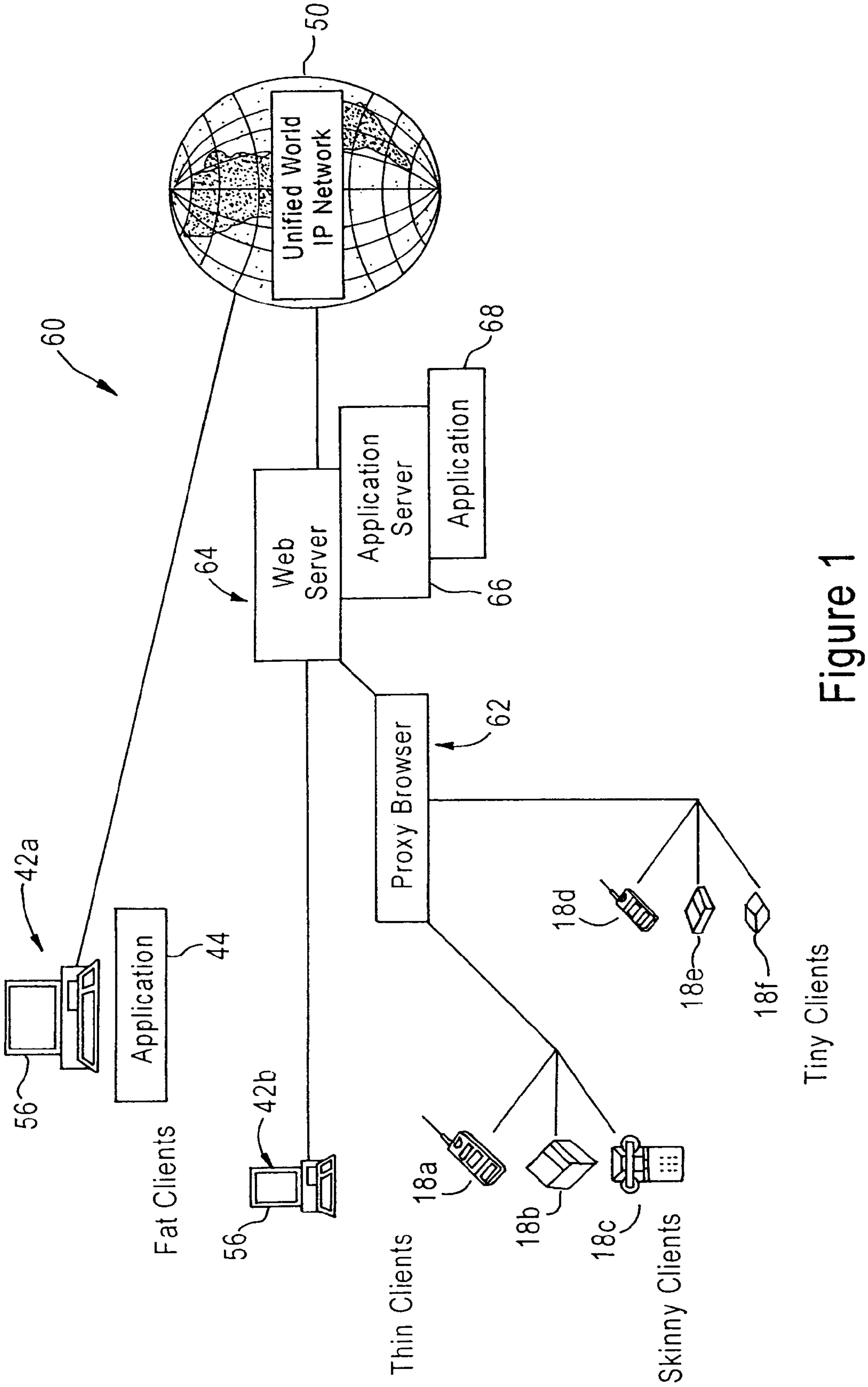
FIG. 1 is a block diagram illustrating a novel paradigm that enables unified voice messaging services and data services to be provided via an IP network using browser audio control according to an embodiment of the present invention.

FIG. 1 is a block diagram illustrating an architecture that provides unified voice messaging services and data services via an IP network using browser audio control according to an embodiment of the present invention. As shown in FIG. 1, each of the clients (tiny clients, skinny clients, thin clients and fat clients) are able to communicate via a single, unified architecture 60 that enables voice communications services between different clients, regardless of whether the client actually has browser capabilities. For example, the fat client 42*a* and the thin client 42*b* are able to execute voice enabled web applications without any hardware modification or any modification to the actual browser; rather, the browsers 56 in the clients 42*a* and 42*b* merely are provided with an executable voice resource configured for providing browser audio control, described below.

The skinny clients 18*a*, 18*b*, and 18*c* and the tiny clients 18*d*, 18*e*, and 18*f* also have access to the unified voice messaging services in the unified network 60 by accessing a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to the interpreting a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18*a* and telephone 18*c* would receive analog audio signals played by the proxy browser 62 and no text information (unless a display is available); the fax machine 18*b* and pager 18*f* would only receive data/text information, and the cellular telephone 18*d* and the handheld computing device 18*e* would receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42*a* and the thin client 42*b* execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common Gateway Interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing. In particular, the application server 66 may either access static XML pages, or the application server 66 may access stored XML application pages (i.e., pages that define an application) and in response generate new XML pages during runtime and supply the generated XML pages to the web server 64.

Figure 2:
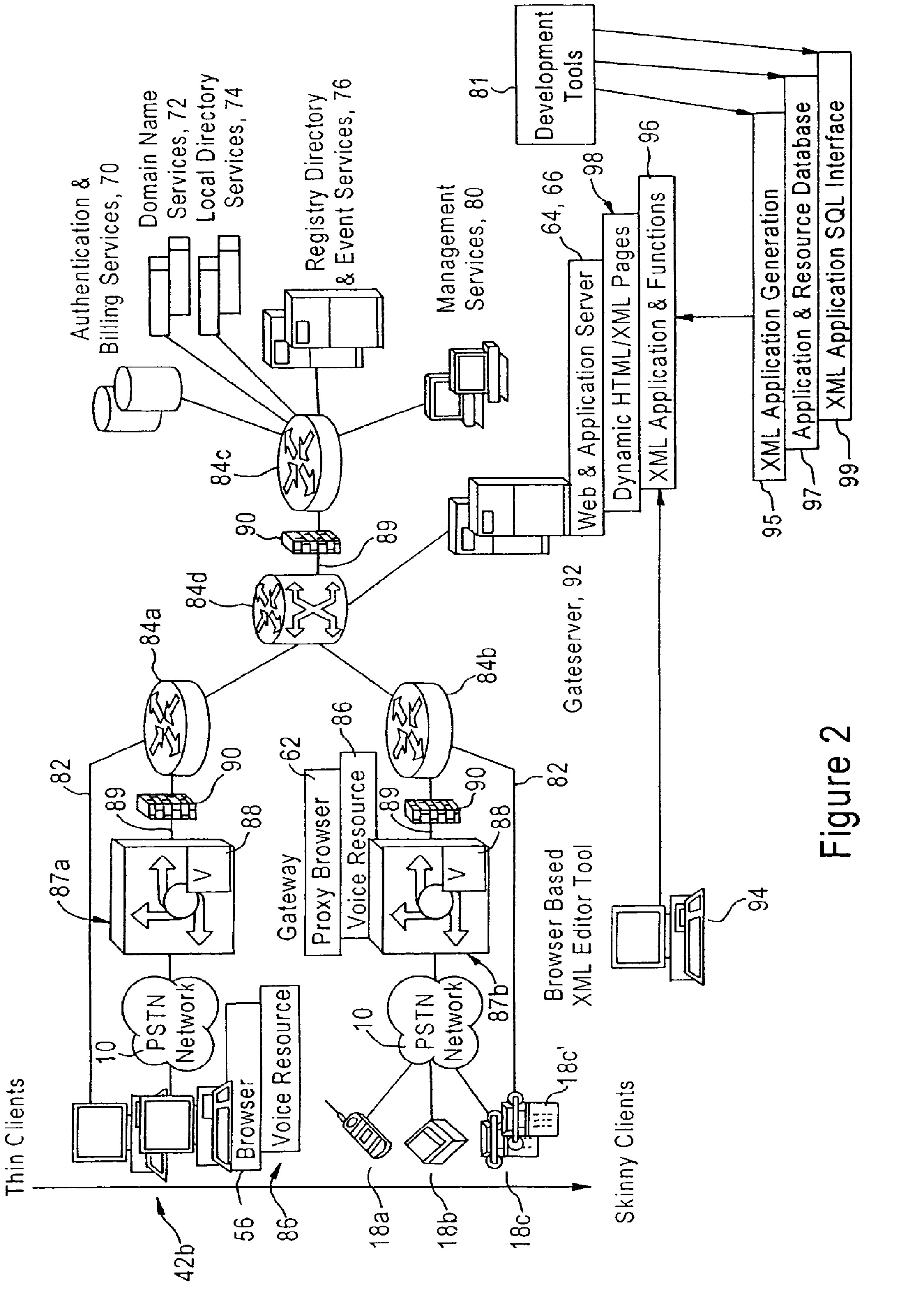
FIG. 2 is a diagram illustrating in further detail implementation of voice applications on the IP network of FIG. 1 according to an embodiment of the present invention.

FIG. 2 is a diagram that illustrates in further detail the network 60 of FIG. 1. As shown in FIG. 2, the arrangement of providing browser audio control for voice enabled web applications enables voice application services to be implemented in a web server paradigm for many different telephony services, including authentication and billing services 70, domain name services 72, local directory services 74, registry directory and event services 76, and management services 78.

FIG. 2 also illustrates in further detail the browser and web application server interaction. In particular, the thin clients 42*b* (and fat clients 42*a*) may be configured for accessing the web server 64 via a direct IP connection 82 to a router 84. The thin client 42*b* can directly access the web server 64 for voice enabled web application services if the thin client 42*b* has a browser 56 and an executable voice resource 86, for example an executable XML aware plug-in resource, described below, or a Java applet embedded within a received HTML page. Alternatively, the thin client 42*b* may access the web server 64 via the public switched telephone network 10, where an IP gateway 87*a* includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87*b*. The IP gateway 87*b* includes both a proxy browser 62 and a voice resource 86, enabling the IP gateway 87 the to provide all audio control service for the skinny clients and tiny clients 18. Hence, the PSTN 10 is used merely for transfer of analog audio signals, with intelligent application processing being provided by the proxy browser 62. Note that if one of the telephones 18*c*' is an IP telephone, then it can access the server 64 via an IP connection 82; in this case, the browser internal to the IP telephone 18*c*' would process only audio functions, and would ignore any tags associated with text or image content.

As shown in FIG. 2, the web server 64, the application server 66, and the voice web applications 68 reside within a gateserver 92. The gateserver 92 includes a browser based XML editor tool 94 that enables a web programmer to design voice applications using XML pages, described below. The XML pages are stored as XML applications and functions 96, for example within a database accessible by the application server 66. The XML pages stored within the XML application and functions 96 may be stored as static pages to be fetched by the web server 64 and supplied to a browser, however the XML pages may also define the actual application to be executed by the application server 66 in runtime. Hence, the application server 66 may execute stored XML applications and functions 96, and in response generate dynamic HTML having XML tags, also referred to as HTML/XML pages.

According to the disclosed embodiment, the browsers 56 and 62 provide audio control for voice enabled web applications based on the HTML-XML pages supplied by the application server 66 to the web server 64 for transport across an HTTP connection. The application server 66 executes stored XML applications, also referred to generally as a web applications, in response to HTML requests from the user. During execution of the stored XML applications, the application server 66 stores in a separate registry 83 (FIG. 5) a data record, also referred to as a "brownie", that specifies the application state for at least one XML application instance. As described in commonly assigned, copending application Ser. No. 09/538,899, filed Mar. 30, 2000, entitled "Apparatus And Method For Providing Server State And Attribute Management For Multiple-Threaded Voice Enabled Web Applications", the disclosure of which is incorporated in its entirety herein by reference, the "brownie" is configured for storing user attribute information and application state information for multiple users associated with a given voice applications session. Hence, the application server 66 may simultaneously and independently control voice application operations for multiple users that may be associated according to a prescribed application condition, for example the possibility of bridging the users together for a phone call or a phone conference.

Hence, the use of a "brownie" configured for storing attributes and state information for multiple users enables the application server to effectively control multiple "lines" for the proxy browser 62 controlling, for example, a voice over IP telephony switch.

As described above, conventional application development techniques involving writing application code using a conventional word processor require a user to have familiarity with executable code syntax. Although use of XML documents to define voice application operations eliminates the necessity of writing programming code, use of a conventional word processor for development of the XML documents still requires the application developer to have substantial knowledge of XML syntax, limiting the ability of a typical user lacking expertise in application development or XML syntax to personalize a voice application.

Certain development tools having direct access to the application server 66 can be used to establish context information used by the application runtime environment within the application server 66 for execution application operations based on parsing of XML documents. In particular, development tools 81 such as a graphic based development system, a forms-based development system, an editor-based development system, or an outline-based development system may be used to define XML tags and procedure calls for the application runtime environment. The development tools 81 may be used to establish an application and resource database 97 to define low-level operations for prescribed XML tags, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag.

The development tools 81 may be used to establish an application programming interface (API) library 99 (e.g., a SQL interface) for the application runtime environment, enabling the application server 66 to issue prescribed function calls to established services, such as IMAP, LDAP, or SMTP. The library 99 may be implemented as dynamically linked libraries (DLLs) or application programming interface (API) libraries. If desired, the development tools 80 may also be used to generate an XML application as a stored text file 95, without the use of the forms generated by the application server 66, described below.

A user of the browser 56 typically sends a request to the application server 66 (via the web server 64) for a voice application operation 99, for example using an interface executable by a browser 56 or 62, for accessing new voice mail messages, new facsimile messages, new e-mail messages, and the like. A user of the browser 56 also can send a request to the application server 66 for creating or modifying an XML document defining a voice application operation, via a development tool common gateway interface (CGI). In particular, the web browser 56 posts a user input for an application operation (i.e., an HTTP request) to a first URL for the voice application operation. In contrast, the web browser 56 posts to another URL for accessing the development tool CGI. Accessing the application server via the CGI enables the application server 66 to access a selected XML document, for example the XML document 100 illustrated in FIG. 3, in order to dynamically generate a form 102, illustrated in FIG. 4, that specifies selected application parameters of the XML document 100. Hence, accessing the application server by posting the user input according to a first URL causes execution of the XML document 100, whereas accessing the application server via the CGI causes the application server 66 to generate a form that specifies the contents of the XML document 100.

Hence, accessing the application server 66 via the CGI enables the web browser to perform different operations on the selected XML document 100, described in further detail in commonly-assigned, copending application Ser. No. 09/559,637, filed Apr. 28, 2000, entitled "Browser-Based Arrangement For Developing Voice Enabled Web Applications Using Extensible Markup Language Documents", the disclosure of which is incorporated in its entirely herein by reference.

Figure 4:
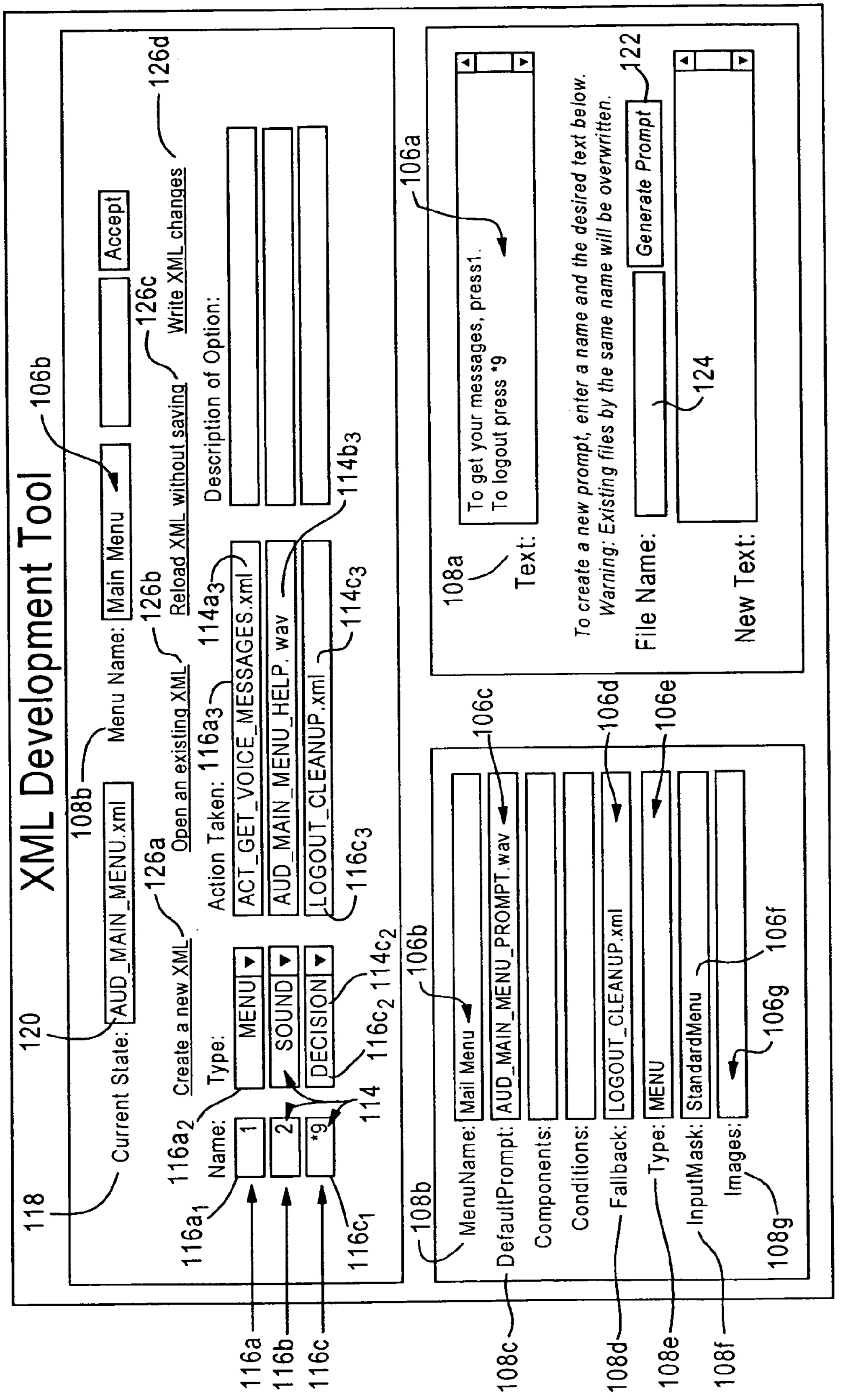
FIG. 4 is a diagram illustrating a browser display of a form for user entry of voice application parameters.

FIG. 4 illustrates the insertion of the application parameters 106 into respective entry fields 108 by the application server 66 for display of the form 102 by the browser 56. As shown in FIG. 4, the application server 66 parses the XML tags 104*a*, 104*b*, 104*c*, . . . 104*g* and in response inserts the application parameters 106*a*, 106*b*, 106*c*, . . . 106*g* into the respective entry fields 108*a*, 108*b*, 108*c*, . . . 108*g*. For example, the application server 66, in response to detecting the XML text tag 104*a*, dynamically generates an HTML document that specifies a form 102 having the entry field 108*a* and including the corresponding application parameter 106*a*; hence, each of the XML tags 104 has a corresponding entry field 108 within the form 102 specified by the HTML page generated by the application server 66, including XML tags 108*g* having empty application parameters 106*g*. Note that XML tags 110 used to define the XML document attributes (and consequently the structure of the form 102) are predefined by one of the developer workstations 81 or the browser based XML editor tool 56*b* that do not rely on the form 102.

The application server 66 also parses the XML option tags 112 for insertion of menu application parameters 114 into the respective menu entry fields 116. For example, the application server 66 inserts the menu application parameters $\mathbf{114}a_1$, $\mathbf{114}a_2$, and $\mathbf{114}a_3$ into the respective menu entry fields $\mathbf{116}a_1$, $\mathbf{116}a_2$, and $\mathbf{116}a_3$, and inserts the menu application parameters $\mathbf{114}c_1$, $\mathbf{114}c_2$, and $\mathbf{114}c_3$ into the respective menu entry fields $\mathbf{116}c_1$, $\mathbf{116}c_2$, and $\mathbf{116}c_3$ generated by the HTML document.

The application server 66 also specifies an entry field 118 that enables the browser user to specify the filename 120 of the XML document (i.e., the designation used by the application server 66 when referring to the "current state"). In addition, the application server 66 specifies an addition button 122 that enables users to add menu options 112 to an XML document; hence, if the user enters a new file name within the entry field 124 and presses the addition button 122, the browser 56 posts to a prescribed URL to cause the application server to generate a new XML document having a name specified in the field 124, and to generate another HTML form having an additional menu entry field 116 for the new prompt.

The application server also specifies within the HTML form 102 prescribed URLs associated with command hyperlinks 126, such that posting the form 102 by the browser 56 to a corresponding one of the URLs 126 results in a corresponding operation performed by the application server 66.

Hence, the HTML entry form 102 generated by the application server 66 provides all the fields and command functions necessary for a user to create or modify a new or existing XML document, regardless of whether the XML document is a menu-based XML document or a non-menu XML document.

Figure 5:
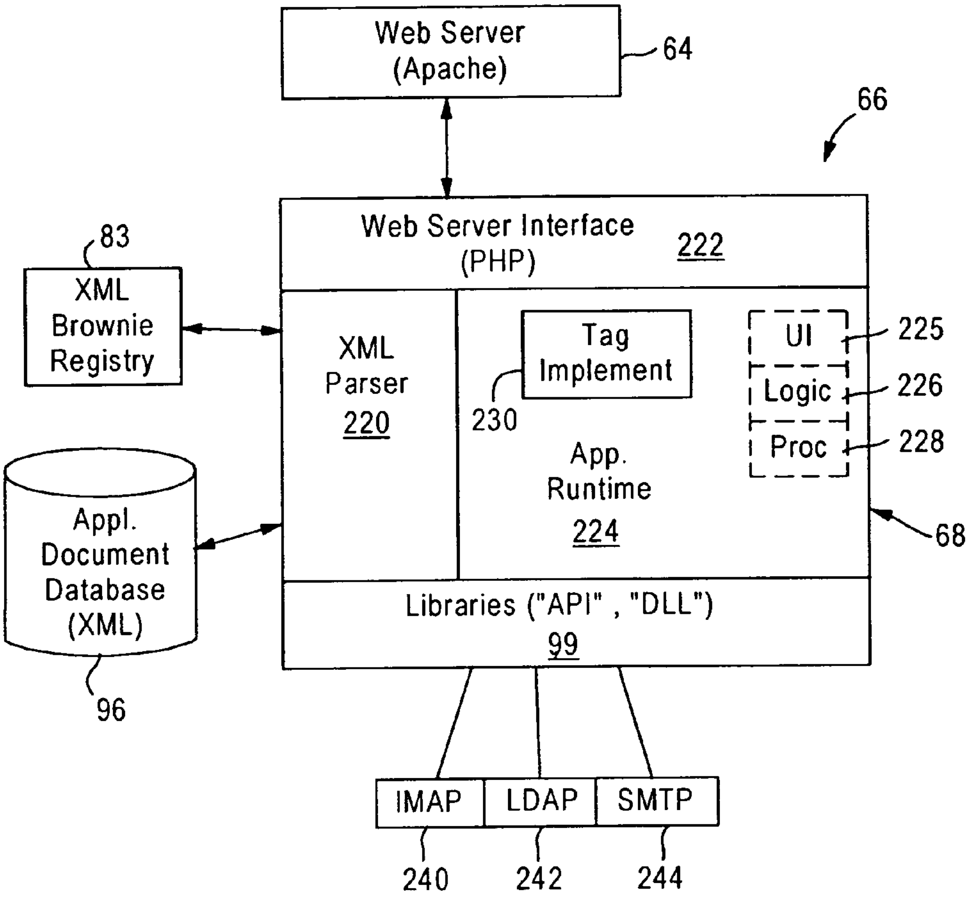
FIG. 5 is a diagram illustrating in detail the application server of FIGS. 1 and 2 according to an embodiment of the present invention.

FIG. 5 is a diagram illustrating in detail the application server 66 according to an embodiment of the present invention. The application server 66 is implemented as a server executing a conventional PHP hypertext processor with XML parsing and processing capabilities. As shown in FIG. 5, the server system 66 includes an XML parser 220 configured for parsing the application-defining XML documents (e.g., XML document 100) stored in the XML document database 96, or the XML documents (i.e., "brownies") stored in the registry 83 and configured for specifying the state and attributes for respective user sessions. The application server 66 also includes a high speed interface 222 that establishes a high-speed connection between the application server 66 and the web server 64. For example, the PHP hypertext processor includes a high-speed interface for Apache Web servers.

The application server 66 also includes a runtime environment 224 for execution of the parsed XML documents. As described above, the runtime environment 224 may selectively execute any one of user interface operation 225, a logic operation 226, or a procedure call 228 as specified by the parsed XML document by executing a corresponding set of executable functions based on the a rule set for the corresponding operation. In particular, the application runtime environment 224 includes a tag implementation module 230 that implements the XML tags parsed by the XML parser 220. The tag implementation module 230 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 230 implements the tag operations that are specified within the XML framework of the stored XML documents.

The application server 66 also includes a set of libraries 99 that may be implemented as dynamically linked libraries (DLLs) or application programming interface (API) libraries. The libraries 99 enable the runtime environment 224 to implement the procedures 228 as specified by the appropriate XML document.

The arrangement for executing a personalized voice-enabled web application will now be described. As described above with respect to FIGS. 2, 3 and 4, a user is able to personalize his or her voice application by sending an HTTP request to the application server 66, for example via a CGI interface, for generation of an HTML document that specifies the form 102 for modifying application parameters of a prescribed XML document. The application server 66 responds to the HTTP request by accessing application document database 72 for retrieval of the selected generic XML document, and by generating the HTML document having the form 102 with the selected application parameters. Once the user modifies (i.e., personalizes) the application parameters within the form 102 and posts the completed form 102 to a prescribed URL via the CGI interface, the application server 66 generates a new user-specific XML document that specifies the voice application operations as personalized by the corresponding user, and stores the user-specific XML document in a user-specific database.

Figure 6:
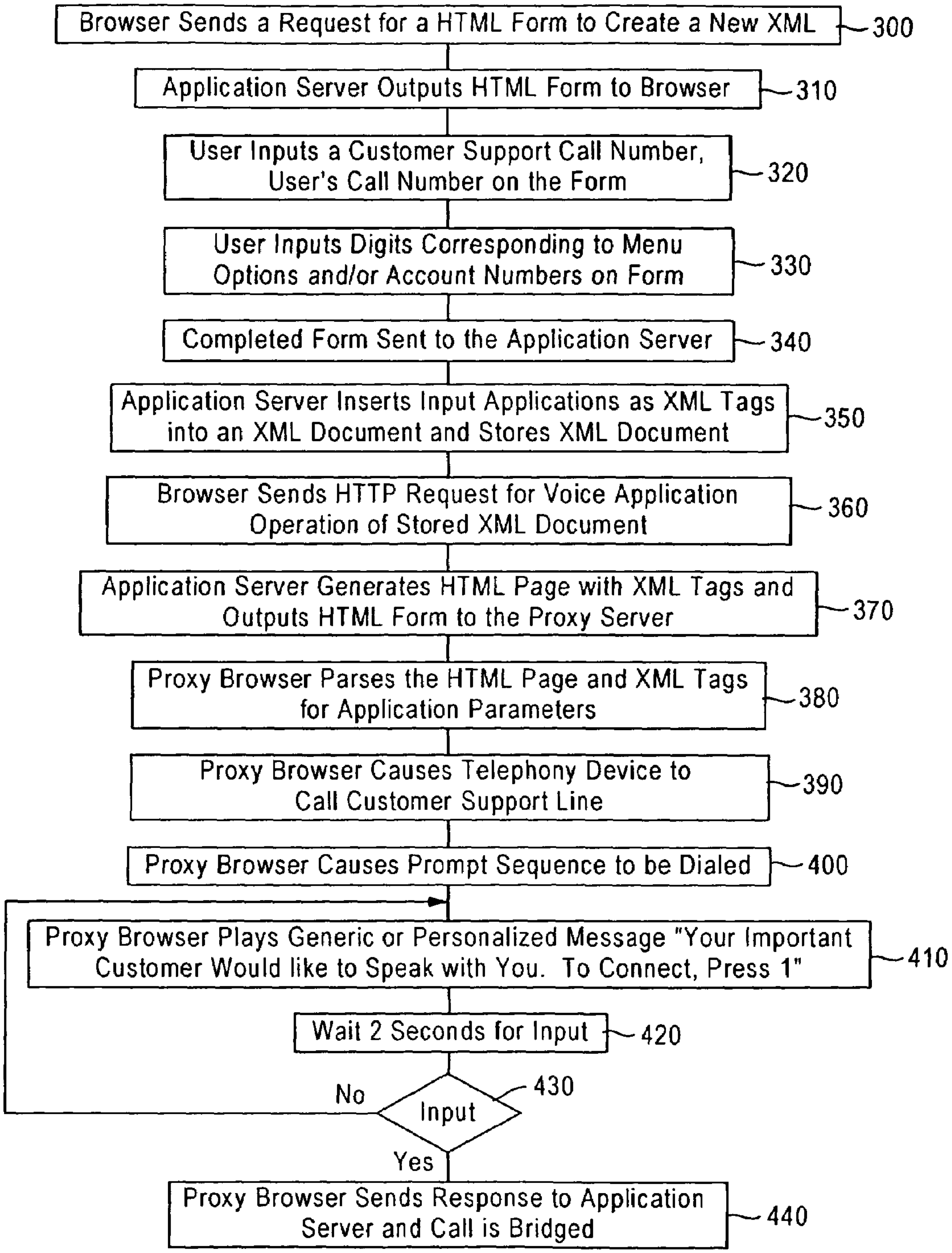
FIG. 6 is a flow diagram illustrating a method of providing user callback according to an embodiment of the present invention.

FIG. 6 is a flow diagram illustrating the method of executing a voice application according to an embodiment of the present invention. The steps described in FIG. 6 can be implemented as executable code stored on a computer readable medium (e.g., a hard disk drive, a floppy drive, a random access memory, a read only the memory, an EPROM, a compact disc, etc.) where the steps to be executed by the application server 66 and the browsers 56 and 62 are stored on computer readable media accessible by the application server 66 and the browsers 56 and 62.

The method begins in step 300, wherein the user by use of the browser 56, sends a request for an HTML form to create a new XML document. The application server 66, in response to receiving the request, outputs in step 310 an HTML form to the browser 56. The user inputs a customer support call number and optionally, the user's call number on the form in step 320. The user's call number may otherwise be stored in a brownie. Optionally, in step 330, the user inputs digits corresponding to menu options and/or account numbers which the user knows will be required prior to speaking with the customer support representative. The proper wait stages may also be entered to ensure the data is processed properly. For example, the user may enter his or her Social Security Number as 123456789 and then press 2 to wait two seconds, and then enter his or her account no. as 34567. The form 102 may also have a record function so that the user can record a message to be played as an audio (.wav) file, for example, "Your important customer, Mary Smith would like to speak with you. To connect, press 1". Alternatively, a pre-recorded message can be created using the editor tool 94.

The completed form 102 is sent to the application server 66 using an HTTP post (e.g., an HTTP put to a prescribed URL) in step 340. The application server 66 in step 350 parses the HTML form and inserts input application parameters as XML tags into an XML document and stores the XML document in the database 96.

In step 360, the user employs the browser to send a second HTTP request for the voice application operation specified by the stored XML. In step 370, the application server generates an HTML page with XML tags and outputs the HTML page to the proxy browser 62. The HTML page contains tags for dialing the second party and, if necessary, for dialing the digits in response to the prompt sequence. In step 380, the proxy browser 62 parses the HTML page and XML tags for application parameters, and executes the operations specified by the XML tags. In particular, the proxy browser 62 sends a command to the associated telephony device (e.g., PBX or voice over IP gateway) to connect with the customer support line via the PSTN 10 in step 390. In response to any prompt sequence, the digits provided step 400 are dialed. In step 410, the proxy browser 62 plays the pre-recorded or personalized message such as "Your important customer would like to speak with you. To connect, press 1". An input waiting period is provided in step 420.

Step 430 determines if an input is made and if an input is detected, in step 440, the proxy browser send a response to the application server which generates a second HTML document having instructions for connecting the second party with the user. Hence, based on the second HTML document, the proxy browser 62 sends a command to the telephony device to connect with the user and the call is bridged by using the brownies as disclosed in the above-incorporated application Ser. No. 09/538,899. If no input is detected, the messages is played repeatedly. A time-out period may be set to terminate the session if no input is received, for example, in 30 minutes. Thus, in the disclosed embodiment, a customer may speak with a customer support representative without ever having to remain on hold. As disclosed, the customer support line is contacted and the line is maintained until a customer support representative indicates that he or she is willing to talk to the customer and if so, the customer is called, and the call is bridged.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A computer readable medium having stored thereon sequences of instructions for executing a voice application, the sequences of instructions including instructions for performing the steps of:

receiving, from a browser, an HTTP request for a form having entry fields for inserting input application parameters specifying information for connecting with a call number of a user and with a call number of a second party, inserting the input application parameters into an XML document defining an operation of the executable voice application, based on the XML document, generating a first hypertext markup language (HTML) document having instructions including the call number for accessing the second party, and based on a prescribed input received from the second party, selectively generating a second HTML document having instructions for connecting the second party with the user.

2. The medium according to claim 1, wherein the XML document includes a prompt sequence for accessing the second party.

3. A method in an application server configured for responding to hypertext transport protocol (HTTP) requests, the method comprising:

in response to a first HTTP request, storing an XML document that specifies a call number of a second party for a user, retrieving the stored XML document based on a second HTTP request by the user;

based on the retrieved XML document generating a first hypertext markup language (HTML) document having instructions including the call number for accessing the second party, based on a prescribed input received from the second party, selectively generating a second HTML document having instructions for connecting the second party with the user, wherein the stored XML document includes a call number of the user and a prompt sequence for accessing the second party, the first HTML document including the prompt sequence and the second HTML document including the call number of the user, and generating a third HTML document that specifies a form including entry fields for the user's call number, the call number of the second party, and the prompt sequence, the method including receiving the form specifying the user's call number, the call number of the second party and the prompt sequence, in the entry field prior to the storing step.

4. The method according to claim 3, wherein the storing step includes dynamically generating the XML document based on the form.

5. A method in an application server for executing a voice application, the method comprising:

receiving an HTTP request requesting a voice application from a user, the voice application being specified in an XML document including information for connecting with a call number of the user and with a call number of a second party, based on the XML document, generating a first hypertext markup language (HTML) document having instructions including the call number for accessing the second party, based on a prescribed input received from the second party, selectively generating a second HTML document having instructions for connecting the second party with the user, wherein the XML document includes a prompt sequence for accessing the second party, the first HTML document including the prompt sequence, and generating a third HTML document that specifies a form including entry fields for the user's call number, the call number of the second party, and the prompt sequence, the method including specifying the user's call number, the call number of the second party and the prompt sequence, in the entry field.

6. The method according to claim 5, wherein the XML document is dynamically generated based on the form.

* * * * *